(12) United States Patent
Liu

(10) Patent No.: US 8,595,512 B2
(45) Date of Patent: Nov. 26, 2013

(54) DATA CONTROL METHOD OF CLOUD STORAGE

(75) Inventor: Hui Liu, Beijing (CN)

(73) Assignee: Beijing Z & W Technology Consulting Co., Ltd, Beijing (CN)

(*) Notice: Subject to any disclaimer, the term of this patent is extended or adjusted under 35 U.S.C. 154(b) by 299 days.

(21) Appl. No.: 12/999,273

(22) PCT Filed: Dec. 1, 2010

(86) PCT No.: PCT/CN2010/079332
§ 371 (c)(1),
(2), (4) Date: Dec. 15, 2010

(87) PCT Pub. No.: WO2012/071720
PCT Pub. Date: Jun. 7, 2012

(65) Prior Publication Data
US 2012/0134494 A1    May 31, 2012

(51) Int. Cl.
*H04L 9/00* (2006.01)
*G06F 21/00* (2006.01)
(52) U.S. Cl.
USPC .............................. 713/193; 726/26; 380/37
(58) Field of Classification Search
USPC .................. 380/37, 44; 726/26, 27
See application file for complete search history.

(56) References Cited

U.S. PATENT DOCUMENTS 8,285,681 B2 * 10/2012 Prahlad et al. ............... 707/640

\* cited by examiner

*Primary Examiner* — Gilberto Barron, Jr.
*Assistant Examiner* — Devin Almeida
(74) *Attorney, Agent, or Firm* — Enshan Hong; VLP Law Group LLP

(57) ABSTRACT

The present application relates to the field of technology of cloud storage data security, and in particular, relates to a data control method of cloud storage. The method comprises: converting the original data by a preset method into irreversible data blocks to form a physical part of the original data, and storing it in the cloud storage data center; outputting information necessary for data restoration of the process of converting the original data to the physical part, as a logical part of the original data, and storing the logical part of the original data in an original data owner controlled storage media. In this invention, the original data to be stored is converted into the physical part, which is then stored in a cloud storage data center. The logical part of the original data required for restoring the physical part to the original data is controlled by owners of the original data. Therefore, the original data owners can control the physical part of data, which physically occupies a large space by controlling the logical part, which physically occupies a small space and therefore, control their data in a cloud storage data center.

7 Claims, 4 Drawing Sheets

DATA CONTROL METHOD OF CLOUD STORAGE

RELATED APPLICATIONS

This is a U.S. National Phase Application under 35 USC §371 of International Application PCT/CN2010/079332 filed on Dec. 1, 2010.

This application claims the priority of Chinese Patent Application No. 201010566288.0 filed Nov. 29, 2010, the entire content of which is hereby incorporated by reference.

TECHNICAL FIELD

This invention relates to data security technology for cloud storage, and in particular, relates to a data control method for cloud storage.

BACKGROUND OF THE INVENTION

Data has proven to be an important asset of enterprises, and the rapid growth of data has made enterprises facing unprecedented challenges. Meanwhile, the cost pressure brought by the rapidly changing world economic situation and fierce competition enables enterprises to have to consider how to reduce IT costs and meet the growing storage needs of enterprises.

The existing storage architecture can be classified into two types: one is a proprietary architecture for one party, such as the DAS (Direct Attached Storage), SAN (Storage Area Network, Storage Area Network) and NAS (Network Access Server). Such storage systems are exclusively used by one party and can provide users with very good control, better reliability and performance, but due to their poor scalability, they do not apply to large-scale deployment; it is quite difficult for users in this mode to flexibly use storage budgets, and a one-time investment is needed to buy storage equipment; along with the increase in storage capacity, the cost control will also face challenges.

The other is a multi-party sharing architecture, that is, cloud storage architecture. According to their different service scopes, they are classified into private cloud and public cloud. The architecture of cloud storage based on network technologies (internet and intranet) provides users with on-demand purchasing and leasing of storage space, and on-demand configuration service; namely, usually, a third party or third-party department in enterprises provides storage apparatus and specialized maintenance personnel. Through the storage service, enterprises or various departments within the enterprises can significantly reduce their internal storage requirements and corresponding administrative costs, to balance the sharply rising storage requirements and business cost pressure. The users who adopt the storage service can be individuals, enterprises, or even departments within the enterprises or branch offices.

However, as for the cloud storage in either mode of operation (private cloud and public cloud), the data owners will inevitably concern about the security and privacy of its data. The risk of the data security and privacy is mainly from the loss of control right of all data after the data are delivered to a third party for custody, that is, data can be visited, copied, moved, modified and so on without the authorization of data owners.

The existing cloud storage security solutions are mostly for cloud storage data centers, such as protection through data encryption (documented in U.S. 2008/0083036, "Off-Premise Encryption of Data Storage", U.S. 2008/0080718, "Data Security in an Off-Premise Environment", and U.S. 2008/0081613, "Rights Management in a Cloud Document"), virtualization and better access control and authentication mechanism (documented in U.S. 2008/0081613, "Rights Management in A Cloud", U.S. 2009/0228950, "Self-Describing Authorization Policy for Accessing Cloud-based Resources", and U.S. 2007/0039053, "Security Server in the Cloud Document.") To some extent, these methods enhance the protection of data by data owner, but these methods do not fully enable the data owners to control all of their data. Typically, as users cannot participate in the management of cloud storage service data center, once users submit their data to cloud storage service providers for saving, the ownership of their data will be out of the control of users.

Taking the public cloud as an example, after users store data in the cloud storage service data center, their data are likely to be stored together with the data of their competitors, so the data owners can not control data leakage caused by human error, professional ethics and other aspects of the data center administrators, in particular, the super users without the limit of access right.

Although encryption protects the control right of data through the keys of users to some extent, it is worth noting that because the problem that the keys require too large space has not been solved, the "one-time pad" encryption algorithm can not be applied in the data encryption technology used by the existing cloud storage data protection. In theory, it can not be proved that the data encryption technologies currently used in the cloud storage services are irreversible, that is, under certain conditions, if enough computing power and adequate time are prepared, the ciphertext from the encryption can be restored to plaintext or part of plaintext. The details can be seen in pages 6 and 12 of *Applied Cryptography Protocols, Algorithms and C Source Code* issued by the China Machinery Industry Press on Mar. 1, 2003.

In other words, with the continuous improvement in decryption technologies, the rapid decline in the price of decryption hardware and the rising performance, it is not guaranteed that the cloud storage users fully control the control rights of all their data only through the encryption key; or although the users grasp the encryption key, the data stored in the cloud storage data center can not be prevented from being illegally cracked and used without authorization.

In short, the existing cloud storage service solutions cannot enable users to move data out of their control (mostly local) to save local storage space, and meanwhile to maintain their right to control all data, but the latter is usually the main concern of users when adopting cloud storage service.

SUMMARY OF THE INVENTION

The purpose of this invention is to provide a data control method for cloud storage, and to facilitate users to maintain control of all their data in a cloud storage data center, when the users move their data to the cloud storage center.

The invention provides a data control method for cloud storage, and the method comprises:

converting original data into irreversible data blocks via a preset method to form a physical part of the original data and to store the physical part in a cloud storage data center;

outputting information, which is necessary for data restoration of the above converting step, as a logical part of the original data, and storing the logical part of the original data, which is to be controlled by users.

In accordance with the present invention, users can control the physical part of data, which physically occupies a large space, by controlling the logical part, which physically occupies a small space and, therefore, control all user owned data in a cloud storage data center.

DETAILED DESCRIPTION OF THE PRESENTLY PREFERRED EMBODIMENTS

The following embodiments and drawings are provided for further illustrating but not for limiting the present invention.

In accordance with an embodiment of the present invention, original data to be stored is converted to a physical part. The physical part is stored in a cloud storage data center. The logical part of the original data, which is required for the physical part to be restored back to the original data, is output. The logical part is controlled by users. Therefore, the users can control the physical part of data, which physically occupies a large space, by controlling the logical part, which physically occupies a small space and, therefore, control the users' owned data in the cloud storage data center.

Figure 1:
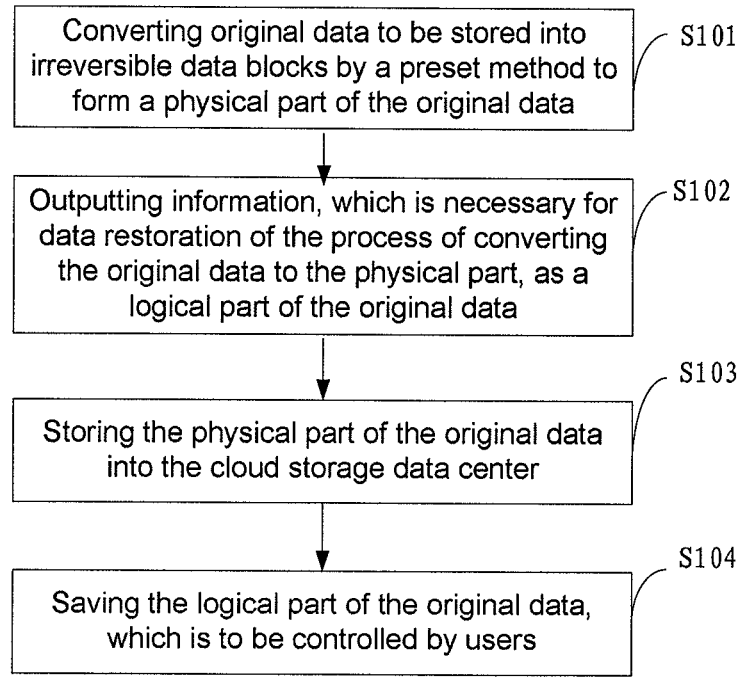
FIG. 1 shows the flow chart of a data control method for cloud storage in accordance with an embodiment of the present invention.

As shown in FIG. 1, the present application provides a data control method for cloud storage. The method comprises the following steps:

Step S101: converting original data to be stored into irreversible data blocks by a preset method to form a physical part of the original data.

The physical part is the true expression of the physical space occupied by the original data, and is a set of data blocks; because computer storage media can only accept 0, 1 values, a string of 0, 1 values is expressed; it is usually converted from the original data through technical means (e.g., the method provided in the present application). The converted data, without the logical part of the original data, cannot be restored to the original data, no matter how much computing power and how much time is used. Therefore, the physical part of the original data is irreversible.

Step S102: outputting information, which is necessary for data restoration of the process of converting the original data to the physical part, as a logical part of the original data.

In accordance with an embodiment of this invention, the logical part of the original data includes information, which is necessary for restoring the physical part of the original data back to the original data. The information comprises: data blocks the original data consists of, the actual expression of the physical part of the original data, and other information required to restore physical part back to the original data. The physical space for this logical part information is not large, but it is indispensable to restore the physical part of the original data back into the original data. In addition, the logical part of the original data also includes the properties, access right and checksum of the original data (such as MD5 value, to verify the accuracy of the retrieved data content).

Step S103: storing the physical part of the original data into the cloud storage data center.

In accordance with an embodiment of this invention, the number of cloud storage service data centers in which the physical part of the original data is stored is unlimited, and it can be one or multiple; in addition, the embodiment of the invention can also report success or failure information of data storing according to the results returned by the cloud storage data center.

Step S104: saving the logical part of the original data, which is to be controlled by users.

The logical part of the original data is stored in a storage server under the user's control, such as a local server; it can also be stored in users' portable storage media, and can also be stored in a cloud storage data center or data server different from the physical part of the original data.

In accordance with an embodiment of the present invention, after users select and store original data in a specified cloud storage data center, a backup archiving strategy and schedule for the data are set, and the original data is converted into a logical part and a physical part in accordance with the set backup archiving strategy and schedule.

After the original data is completely converted, the physical part of the original data is sent in accordance with the preset cloud storage service access protocols, such as authentication and billing records, to a specified cloud storage data center to save, and the logical part of the original data is stored, and controlled by the users.

Since the physical part of the original data cannot be restored to the original data in the absence of the logical part of the original data. In other words, the physical part of the original data comprises meaningless 0, 1 character strings in the absence of the logical part of the original data, and it cannot be read and used. Therefore, after physical part and logical part are saved separately, if the logical part of the original data is controlled, then the entire data is controlled.

Figure 2:
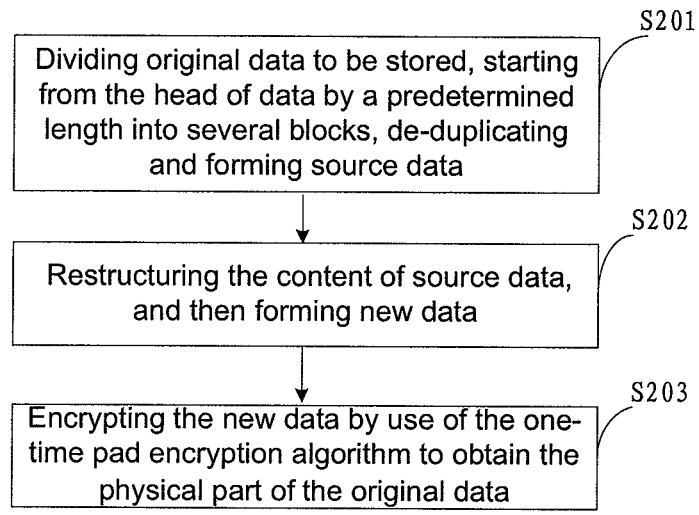
FIG. 2 shows the flow chart of a method of converting original data into data blocks to form a physical part of the original data in accordance with an embodiment of the present invention.

As shown in FIG. 2, an embodiment of the invention provides a method for converting the original data to be stored into data blocks to form a physical part of the original data. The method includes the following steps:

Step S201: dividing original data to be stored, starting from the head of data by a predetermined length into several blocks, de-duplicating and forming source data;

Since data deduplication has been widely used in the industry, it's not necessary to go into details here.

Step S202: restructuring the content of source data, and then forming new data;

In the embodiment of the present invention, the content of source data can be restructured by data content sequence restructuring the method of or by random data content restructuring method.

Figure 3:
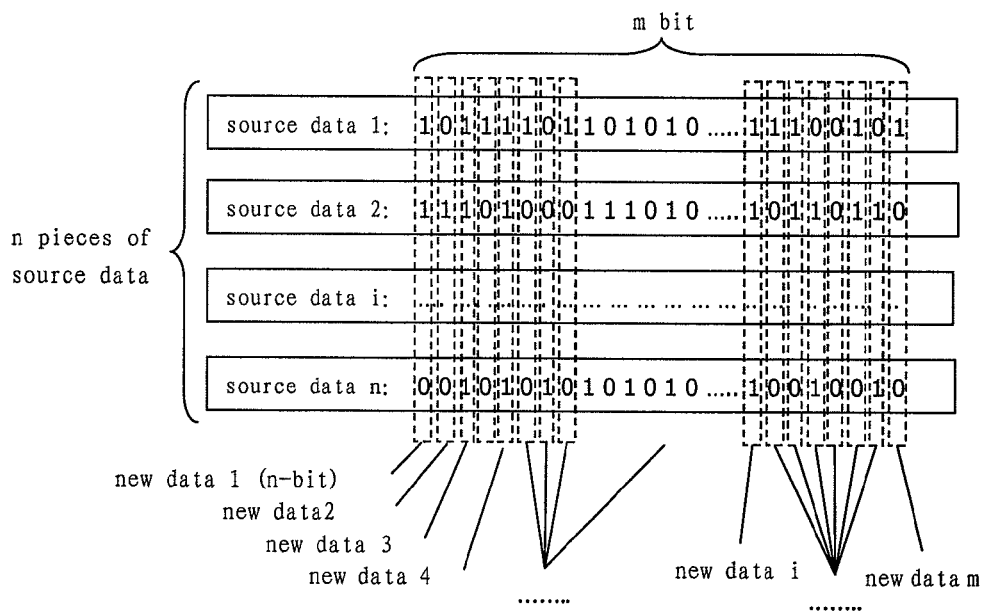
FIG. 3 shows a schematic diagram for sequence restructuring of source data in accordance with an embodiment of the present invention.

The method of data content sequence restructuring includes: according to the preset queuing discipline of fixed order, acquiring the data in the same position of each source data, and combining the acquired data in order to form a new data; for example, restructuring longitudinally n pieces of the specified m-bit source data packeted and aligned to form m pieces of n-bit new data, thus completing the sequence restructuring of the content of the packeted source data, as shown in FIG. 3.

Figure 4:
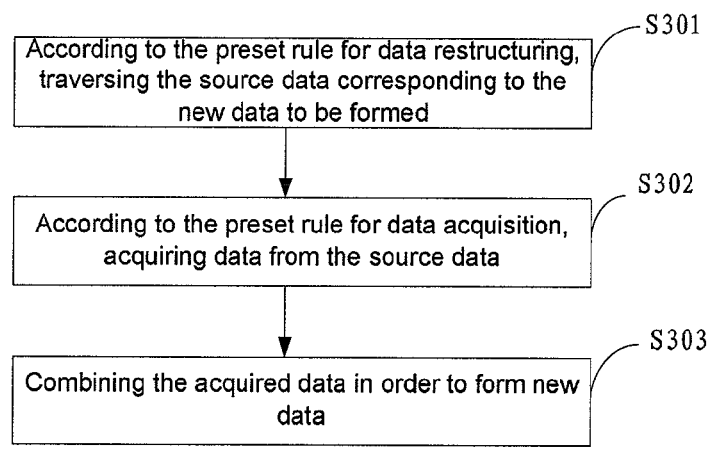
FIG. 4 shows the flow chart of a method for random restructuring of source data in accordance with an embodiment of the present invention.

The method for random restructuring of data content includes the following steps, as shown in FIG. 4:

Step S301: according to the preset rule for data restructuring, traversing the source data corresponding to the new data to be formed.

Step S302: according to the preset rule for data acquisition, acquiring data from the source data.

Step S303: combining the acquired data in order to form new data.

Figure 5:
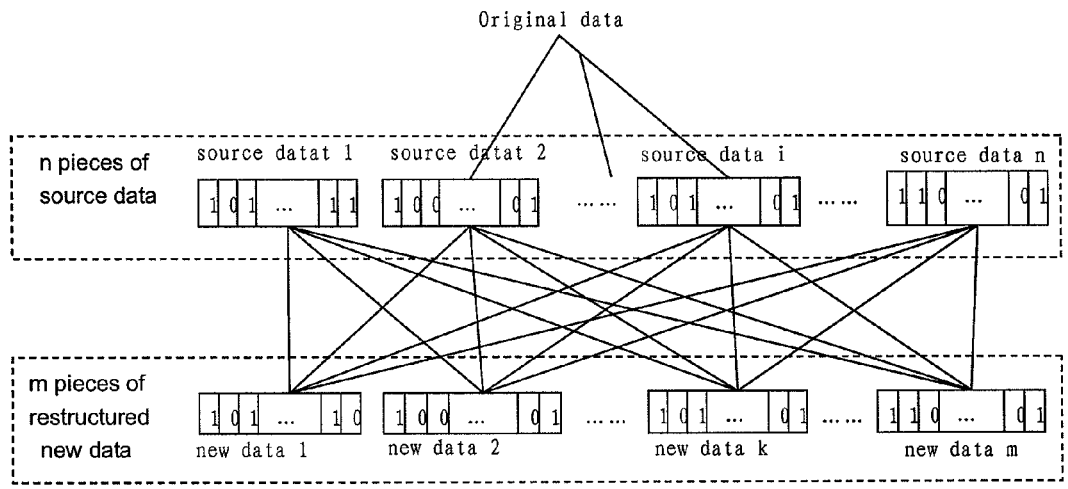
FIG. 5 shows a schematic diagram for random restructuring of source data in accordance with an embodiment of the present invention.

The specific method for random restructuring of data content is shown in FIG. 5; assuming that the original data are converted, a string of source data, that is, source data 2-source data i, is obtained, and all or part of the source data corresponding to the original data, together with other source data are formed to a group of source data to be restructured;

Assuming n pieces of f-bit source data in the specified group are restructured to m pieces of g-bit new data, each new data is corresponding to p pieces of source data ($1 \leq p \leq n$, it will affect performance if p is too big, and it will affect the safety if p is too small), and each source data is corresponding to r pieces of new data ($1 \leq r \leq m$). In the process of constructing new data, the data is acquired from each data source for u times, and v-bit ($1 \leq v \leq f$) is adopted each time.

The source data i is identified as $sd_i$, and the new data k as $td_k$. Where, m, n, p, r, l and k are natural numbers, u, v is an integer greater than or equal to 0, and p, u and v are random numbers;

The detailed structuring process is as follows: when the new data k ($td_k$) is structured, at first, traversing p pieces of source data corresponding to it, acquiring data from each source data for u times, and v-bit data are acquired each time. The data identifier of the new data k acquired from the source data i at the time q ($1 \leq q \leq u$) is $\text{Ext}_{iq}^{k}(S_{iq}, e_{iq})$, of which $s_{iq}$ is the starting cursor position of data acquisition randomly generated, $e_{iq}$ is the ending cursor position of data acquisition randomly generated, and $s_{iq}$ and $e_{iq}$ are natural numbers, and $s_{iq} \leq e_{iq}$; if $s_{iq} = e_{iq}$, the bit of the data acquisition for determined time is 0, clearly $v = e_{iq} - s_{iq} + 1$. The data acquired are in order combined to the necessary new data built, expressed as below:

$$td_k = (\text{Ext}_{11}^{k}(s_{11}, e_{11}), \text{Ext}_{12}^{k}(s_{12}, e_{12}), \ldots, \text{Ext}_{pu}^{k}(s_{pu}, e_{pu})).$$

At the same time after each time data acquisition, generating synchronously the corresponding relationship between source data and new data. Supposing v-bit data is acquired at the time q from $sd_i$, that is, $\text{Ext}_{iq}^{k}(s_{iq}, e_{iq})$, and they are placed in the corresponding positions in the $td_k$ (calculated after the acquired data are placed in the $td_k$); Identifying the data bits of the v-bit data acquired from $sd_i$ corresponding to $td_k$ as $\text{Rxt}_{kq}^{i}(s_{kq}, e_{kq})$, of which $s_{kq}$ is the starting cursor position corresponding to the acquired data in the $td_k$, $e_{kq}$ is the ending cursor position corresponding to the acquired data in the $td_k$, and $s_{kq}$ and $e_{kq}$ are natural numbers, and $s_{kq} \leq e_{kq}$; in case of $s_{kq} = e_{kq}$, the bit of the data acquisition at determined time is 0; after further analysis, the source data $sd_i$ can be combined in sequence by reversely acquiring the specified data bits of its corresponding new data.

$$sd_i = (\text{Rxt}_{11}^{i}(s_{11}, e_{11}), \text{Rxt}_{12}^{i}(s_{12}, e_{12}), \ldots, RXt_{ru}^{i}(s_{ru}, e_{ru}))$$

Similarly, when the (k+1)th new data is structured, traversing the source data corresponding to the (k+1)th new data and acquiring according to the method above (the data being acquired can not be repeated over the previous acquired data, that is, the data in the source data must not be repeatedly acquired), and so on, until the restructuring of all source data is completed, and meanwhile all the new data and the corresponding relationship between new data and all source data are generated.

In the method above, each source data and new data after restructuring can be of a fixed length or variable length, and p, u and v can be a variable, that is, they can be different when a new data is structured each time; the method for the generation of p, u and v true random numbers should be noted. A variety of methods for the generation of true random numbers are given in page 301 of *Applied Cryptography Protocols, Algorithms and C Source Code* issued by the China Mechanical Industry Press on Mar. 1, 2003, such as the use of random noise, the use of computer clock, CPU load, and arrival times of network data packet, for which there is no need to discuss in detail. Assuming that three true random numbers R1, R2 and R3 have been generated by a method, then $$p = R1 \bmod n$$

$$u = R2 \bmod w$$

$$v = R3 \bmod f$$

Where, mod is modulo operation, w is the maximum value of the specified u, and f' is the remaining data bits not acquired in the source data.

Step S203: encrypting the new data by use of the one-time pad encryption algorithm to obtain the physical part of the original data.

In the embodiment of the invention, after the content of the source data is restructured, the unbreakable "one-time pad" encryption algorithm is used to encrypt the restructured data, thus more strengthen the security of the original data.

In the embodiment of the invention, after the above step S203, the information of the corresponding relationships between the new data and source data, between source data and original data, and between new data and cryptographic key is output and saved into the logical part of the original data.

Figure 6:
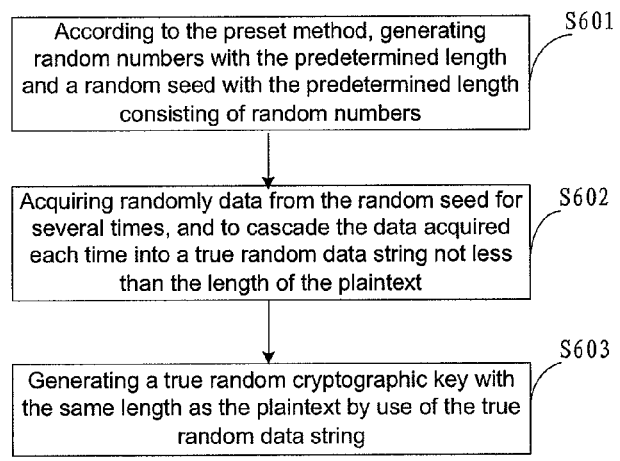
FIG. 6 shows the flow chart of a method used to generate the key for one-time pad in accordance with an embodiment of the present invention.

As shown in FIG. 6, the embodiment of the invention provides a method for the key generation of the one-time pad encryption algorithm, and the following steps are below:

Step S601: according to the preset method, generating random numbers with the predetermined length and a random seed with the predetermined length consisting of random numbers.

Step S602: acquiring randomly data from the random seed for several times, and to cascade the data acquired each time into a true random data string not less than the length of the plaintext.

Step S603: generating a true random cryptographic key with the same length as the plaintext by use of the true random data string.

When the length of the true random data string is equal to the length of the plaintext, the true random data string can be selected as a true random cryptographic key for encryption; when the length of the true random data string is greater than the length of the plaintext, the true random data string is traversed, beginning from the random starting position of the true random data string to acquire a data string with the same length as the plaintext and to generate a true random cryptographic key; if a data string with the same length as the plaintext has not yet been acquired to the end of the true random data string, returning to the head of the true random data string to continue acquiring until the data string with the same length as the plaintext is acquired.

In the following, a method for the generation of the random cryptographic key used for one-time pad encryption in the embodiment of the invention is provided, but the protective range of the invention is not limited to the embodiment.

In the embodiment, the generated true random cryptographic key has a fixed length, that is, it is equal to the length of the plaintext.

The m, n and p below are natural numbers, where, m is the length of the random seed, l is the length of the random key required to be generated (equal to the length of the plaintext), p is the data bits generated in the random key, and l-p is the remaining data bits not acquired in the random cryptographic key.

Firstly, generating a string of m-bit random number 0, 1 with the predetermined length and a random seed with the predetermined length consisting of the random number, and storing it;

Secondly, acquiring random data for the preset n times from the random seed; if the data are acquired to the tail of the random string, returning to the head of the random seed to continue data acquisition, and cascading the data acquired each time into a true random data string with the predetermined length l, that is, true random cryptographic key (l is equivalent to the length of the plaintext).

Before each data acquisition, generating two true random numbers at first, and then operating the two random numbers modulo to obtain the starting cursor position needed for the random data acquisition and the length of the data required for being acquired.

The starting cursor position for data acquisition each time and the acquired data length (can be greater than or equal to 0) are random.

Assuming two random numbers R1, R2 are generated before data acquisition, now two random values T1 and T2 less than m and l-p need to be generated, then $$T1 = R1 \bmod m$$

$$T2 = R2 \bmod (l-p)$$

Where, mod is modulo operation.

Figure 7:
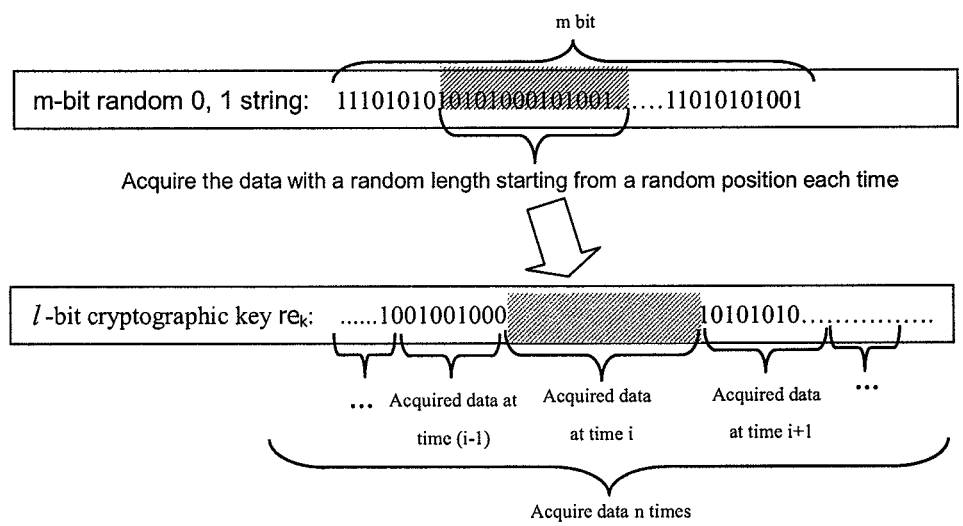
FIG. 7 shows the schematic diagram of a method for data acquisition in accordance with an embodiment of the present invention.

As shown in FIG. 7, identify the true random cryptographic key corresponding to the plaintext k as $re_k$ (k is natural number), $re_k$ is equal to the sequence combination of the data acquired randomly for n times from the random seed with the predetermined length; if the data acquired from the random seed at the time i is $(Cur_s, Cur_e)_i$, of which $Cur_s$ is the starting cursor position of the data acquired at the time i in the random seed, correspondingly, $Cur_e$ is the ending cursor position of the data acquired at the time i, and $Cur_s$ and $Cur_e$ are the offset identifier from the head of the random seed; clearly, $Cur_s$ and $Cur_e$ are an integer greater than or equal to 0, and less than or equal to m, and $Cur_e$ is greater than or equal to $Cur_s$; when $Cur_s$ is equal to $Cur_e$, the bit of the data acquired at determined time is 0. Then the data acquired at the time i is between $Cur_s$ and $Cur_e$ in the random seed with the specified length. Further, $re_k$ can be expressed as:

$$re_k = [(Cur_s, Cur_e)_1, (Cur_s, Cur_e)_2, \ldots (Cur_s, Cur_e)_i, \ldots (Cur_s, Cur_e)_n]_k.$$

This above is just one implementation method. In addition to this implementation, there are also, the method for key generation with fixed times of data acquisition and variable length of random key, that is, n is determined and l is variable; the method for key generation with variable times of data acquisition and fixed length of random key, that is n is variable and l is determined; the method for key generation with variable times of data acquisition and variable length of random key, that is, both n and l are uncertain; and the method that a random key is operated by another random key for the determined times and then the plaintext is encrypted with it.

After the true random cryptographic key is generated, the new data after its content is restructured is encrypted, and thus, the data encryption can be achieved with the "one-time pad" algorithm.

Since there has been no precedent of the application of "one-time pad" encryption algorithm as the traditional method of cloud storage data encryption, in theory, it is reversible from the physical part of the data in the cloud storage data center protected by the traditional encryption methods to the restoration of source data, but the technical solution proposed in the invention can achieve that it is irreversible from the physical part of the data in the cloud storage data center protected to the restoration of source data, that is, it is unbreakable.

To further clarify the feasibility of the invention, the physical space occupied by the logical part of the original data is now analyzed as follows, First, analysis on the physical space occupied by the logical part of the original data with the method of data content sequence restructuring:

In this method, the information of the logical part of the original data includes the corresponding relationship between the source data and new data in the content restructuring, and the corresponding relationship between the plaintext (the new data after the content restructuring) and random key.

Assuming that the content of a number of 1 MB deduplicated data blocks needs to be restructured and encrypted, the encryption function uses the XOR (the length of the random key is required to be equal to that of the plaintext), and data need to be randomly acquired for 100 times before the generation of each random cryptographic key.

In the sequence restructuring, the source data and new data are arranged regularly, so the physical space actually occupied by the corresponding relationship between them can be ignored, as long as the arrangement orders of the source data and new data are recorded.

Below, the space occupied by the corresponding relationship between the plaintext encrypted with the "one-time pad" and the random key is analyzed: Assuming a length of 8M (=8,000,000)-bit cryptographic key is required to be generated to encrypt 1 MB (also 8M bits) data. The size of the random seed used is 1 Gbit, that is, 1000, 000, 000-bit 0, 1 random string, and if data need to be acquired randomly for 100 times to generate each random key, n=100.

Then, the physical space occupied by each cursor position is not greater than 4 bytes, so the physical space occupied by the cursor expression for data acquisition every time is not greater than 8 bytes, then the data are acquired for 100 times, that is 800 bytes, not exceeding 1024 bytes (=1 KB).

Therefore, after the content of each 1 MB source data is sequence restructured and is converted with one-time pad encryption algorithm, about 800B of physical space is required to store the information of the logical part of the source data; through further calculations, the ratio of the physical space occupied by information of the logical part of the source data to that occupied by the source data is roughly 1:1250. As the source data are derived from the decomposed and deduplicated original data, the relative physical space occupied by the information of the logical part of the original data has a smaller proportion.

Second, analysis on the space occupied by the logical part of the data with the method of data content random restructuring:

Similar to the method of sequence restructuring, the information of the logical part of the original data includes the corresponding relationship between source data and new data and the corresponding relationship between the plaintext (the new data after the content restructuring) and random cryptographic key.

Analysis on the physical space occupied by the corresponding relationship between the saved source data and new data:

Corresponding to the restoration of each source data, the information of the corresponding relationship between the source data and new data required to be saved is mainly as follows:

$$sd_i = (Rxt_{11}{}^i(s_{11},e_{11}), Rxt_{12}{}^i(s_{12},e_{12}), \ldots, Rxt_{ru}{}^i(s_{ru},e_{ru}))$$

If the size of the source data and the restructured new data is 1 MB, that is, the source data and new data are of the same length, it can be calculated that the physical space occupied by the cursor in each new data (i.e. $s_{kq}$ or $e_{kq}$, where $s_{kq}$ is the starting cursor position corresponding the acquisition data in the $td_k$, and $e_{kq}$ is the ending cursor position corresponding to the acquisition data in the $td_k$) is not greater than 3B, so the physical space occupied by each corresponding data in the starting and ending cursor of $td_k$ is not more than 6B in the corresponding relationship above. Each new data needs to be acquired for 100 times before its generation (that is, when new data is generated, each corresponding source data is acquired once), then that is, 600B physical space needs to store the corresponding relationship between the new data and source data after 1 MB new data is generated.

With the one-time pad encryption algorithm, the physical space occupied by the corresponding relationship between the plaintext (the new data after the content restructuring) and the random key is shown in the following:

Assuming that 8M (=8,000,000) bit key is required to be generated for encrypting 1 MB (also 8M bits) data, the size of the random seed used is 1 Gbit, that is, 0, 1 1000,000,000-bit random string, and if data needs to be acquired randomly for 100 times to generate each random key, that is, n=100.

Then, the physical space occupied by each cursor position is not greater than 4 bytes, so the physical space occupied by the cursor expression of data acquisition every time is not greater than 8 bytes, and total required space for the data acquired for 100 times is 800 bytes.

Therefore, after the content of each 1 MB source data is randomly restructured and is converted with one-time pad encryption algorithm, about 1400B of physical space is required to store the information of the logical part of the source data; through further calculations, the ratio of the physical space occupied by information of the logical part of the source data to that occupied by the source data is roughly 1:730. As the source data are derived from the decomposed and deduplicated original data, the relative physical space occupied by the information of the logical part of the original data has a smaller proportion.

It should be noted that the calculation of physical space occupied by the logical part of the data with the above two methods not includes the physical space occupied by the random seed (because it is a one-time cost, and is shared for all the data to be encrypted.) Further, it can be seen that through the above content restructuring and the encryption with the one-time pad algorithm, the design purpose of the invention can be achieved, that is, data are reasonably converted and transformed to the physical part and logical part of the original data, of which the physical space occupied by the physical part is large but the physical space occupied by the logical part is small.

In the two implementations above, the physical part of the original data can not alone be restored to the original data in the absence of a logical part of the original data.

Because the one-time pad encryption algorithm is not cracked no matter how much the computer is powerful, as shown in Pages 6, 12 of *Applied Cryptography Protocols, Algorithms and C Source Code* issued by the China Mechanical Industry Press on Mar. 1, 2003;

Second, even if cryptanalysts have obtained a suspicious plaintext through a number of attempts, because content of plaintexts have equal possibility under the system of the one-time pad encryption algorithm, and all keys are random and used only once, the cryptanalysts are unable to determine what are right plaintexts; On the other hand, because all data content has been restructured before the data encryption and transmission, the received so-called "suspicious" plaintexts can not be correctly interpreted.

In short, through the above methods, the physical part of the original data cannot alone be restored to the original data.

After the data blocks formed through the conversion of original data are de-duplicated, restructured and encrypted, the physical part of the original data can not alone be restored to the original data under the premise of no information of the logical part of the original data, while the space occupied by the logical part of the original data is relatively very small, and thus the entire data is controlled by controlling the logical part of the data occupying a relatively small physical space, and then users use cloud storage service to save the local storage space, and meanwhile maintain control over all the data through separate saving of the logical part and physical part of the original data.

In the embodiment of the invention, upon receipt of an external access request on the original data, first of all, get the logical part of the original data saved, and based on the predefined cloud storage service access protocols, such as authentication, payment and billing records and the obtained logical part, retrieve the corresponding physical part from the determined cloud storage data center, and then, according to the information stored in the logical part of the original data obtained, restore and aggregate the physical part to original data, and return back the restored original data to the external access request, thus achieve the restoration of the retrieved data.

In this invention, the original data to be stored are converted into irreversible data blocks to form the physical part of the original data, and output the information necessary for data restoration in the process of converting the original data to physical part, as the logical part of the original data, but the physical part of the original data can not be restored into the original data without the logical part of the original data, then the physical part of the original data is stored in the cloud storage data center, and the logical part of the original data is saved, and controlled by users, thus controlling the physical part of data physically occupying a large space by controlling the logical part physically occupying a small space, achieving the control of all owned data, and saving physical storage space while ensuring the security and privacy of user data.

All above is just the preferred embodiment of the invention, but is not used to limit the invention; any changes, equivalent replacements and improvements and other aspects made within the spirit and principle of the invention should be included in the protective range of the invention.

The invention claimed is:

1. A data control method for cloud storage comprising:
    converting original data into irreversible data blocks via a preset method to form a physical part of the original data;

storing the physical part of the original data in a cloud storage data center;

outputting information, which is necessary for restoring the physical part back to the original data, as a logical part of the original data; and storing the logical part of the original data in a storage media, which is controlled by the owner of the original data;

wherein the converting step comprises: dividing the original data, starting from the data head by a predetermined length, into several data blocks, and de-duplicating the data blocks before forming source data; restructuring contents of the source data to form new data; and encrypting the new data with a one-time pad encryption algorithm to form the physical part of the original data;

wherein the restructuring step comprises: acquiring data in the same position of each source data, based on queuing discipline of preset fixed order; and combining the acquired data in order to form new data.

2. The method of claim 1 wherein the physical part of the original data is a string of computer-readable 0, 1 values without the characteristics of the original data; the physical part of the original data is not reversible in the absence of the logical part of the original data.

3. The method of claim 1 wherein the logical part of the original data comprises information concerning the attribute, access right and verification value of the original data.

4. The method of claim 1 wherein the storage media is selected from the group consisting of a portable storage media, alocal server, a server that is not being used for the storage of the physical part of the original data, and combinations thereof.

5. The method of claim 1 wherein the restructuring step comprises:
traversing the source data corresponding to the new data to be formed, based on preset rules for data restructuring;
acquiring data from the source data, based on preset rules for data acquisition; and
combining the acquired data in order to form new data.

6. The method claim 1 wherein the encrypting step comprises:
generating and storing true random numbers with the predetermined length and the random seed with a predetermined length consisting of said random numbers, based on a preset method;
acquiring the random data for several times from the random seed, and cascading the data acquired every time into a true random data string with no less than the length of the plaintext;
generating a true random cryptographic key with the same length as the plaintext, based on the true random data string; and
encrypting each new data with the true random cryptographic key.

7. The method of claim 6 wherein the encrypting step comprises:
outputting and saving information of the corresponding relationship between the new data and source data, between the source data and the original data, and between the new data and true random cryptographic key, into the logical part of the original data.

* * * * *